United States Patent
Berdah et al.

(10) Patent No.: US 12,229,544 B2
(45) Date of Patent: Feb. 18, 2025

(54) SYSTEM AND METHOD FOR SOFTWARE UPDATE IN AIRCRAFT

(71) Applicant: PRATT & WHITNEY CANADA CORP., Longueuil (CA)

(72) Inventors: Daniele Berdah, Montréal (CA); James Mood, Mansfield, MA (US)

(73) Assignee: PRATT & WHITNEY CANADA CORP., Longueuil (CA)

( * ) Notice: Subject to any disclaimer, the term of this patent is extended or adjusted under 35 U.S.C. 154(b) by 160 days.

(21) Appl. No.: 17/672,454

(22) Filed: Feb. 15, 2022

(65) Prior Publication Data
US 2023/0259348 A1  Aug. 17, 2023

(51) Int. Cl.
G06F 8/65 (2018.01)

(52) U.S. Cl.
CPC ................... G06F 8/65 (2013.01)

(58) Field of Classification Search
None
See application file for complete search history.

(56) References Cited

U.S. PATENT DOCUMENTS

| | | | | |
|---|---|---|---|---|
| 6,438,468 B1* | 8/2002 | Muxlow | ............... | G08G 5/0026 701/29.6 |
| 11,334,340 B2* | 5/2022 | De Meulder | ............ | H04L 63/04 |
| 2004/0106404 A1* | 6/2004 | Gould | ....................... | G06F 8/60 455/431 |
| 2006/0248524 A1* | 11/2006 | Seely | ........................ | G06F 8/61 717/174 |
| 2009/0198393 A1* | 8/2009 | Sims, III | ................... | G06F 8/64 701/3 |
| 2009/0327483 A1* | 12/2009 | Thompson | .............. | G06F 16/10 709/224 |
| 2014/0121861 A1* | 5/2014 | Mood | ................. | G06F 9/44505 701/3 |
| 2017/0139778 A1* | 5/2017 | Kito | ...................... | G06F 11/1433 |
| 2018/0121188 A1* | 5/2018 | Srinivasan | ................ | G06F 8/65 |
| 2018/0212989 A1* | 7/2018 | Mavani | ............... | H04L 63/1416 |
| 2019/0167902 A1* | 6/2019 | Kamen | ............. | A61M 5/14244 |
| 2019/0384587 A1* | 12/2019 | Rao | ........................ | G06F 21/572 |
| 2021/0095662 A1* | 4/2021 | Hein | ........................ | F04B 49/06 |
| 2021/0152237 A1* | 5/2021 | King | ........................ | H04W 88/06 |
| 2021/0157561 A1* | 5/2021 | Gilton | ........................ | B64F 5/40 |

FOREIGN PATENT DOCUMENTS

EP  2945060 A2 * 11/2015 ............... G06F 8/61

OTHER PUBLICATIONS

Lightbody, "Aircraft Gas Turbine Electronic Engine Controllers (EEC)", 2014, Encyclopedia of Aerospace Engineering (Year: 2014).*

* cited by examiner

*Primary Examiner* — Hossain M Morshed
(74) *Attorney, Agent, or Firm* — NORTON ROSE FULBRIGHT CANADA LLP

(57) ABSTRACT

There is provided a software update method and system for an aircraft. Software data is obtained at a computing device mounted to the aircraft, the software data comprising a software loader and one or more software files containing an update to a software configuration of at least one target device mounted to the aircraft and communicatively coupled to the computing device. The software loader is executed at the computing device to install the one or more software files into the at least one target device and thereby modify the software configuration of the at least one target device according to the update.

14 Claims, 5 Drawing Sheets

SYSTEM AND METHOD FOR SOFTWARE UPDATE IN AIRCRAFT

TECHNICAL FIELD

The application relates generally to aircraft and, more particularly, to software updates in aircraft.

BACKGROUND OF THE ART

Modern aircraft have systems controlled by software developed and approved under relevant certification processes. In order to ensure that these systems function properly, the software should be maintained in a configuration relevant to each particular aircraft. However, modifying the software installed in an aircraft system component may require removal of the component from the aircraft or use of special equipment. Therefore, there is room for improvement.

SUMMARY

In one aspect, there is provided a software update method for an aircraft. The method comprises obtaining software data at a computing device mounted to the aircraft, the software data comprising a software loader and one or more software files containing an update to a software configuration of at least one target device mounted to the aircraft and communicatively coupled to the computing device, and executing, at the computing device, the software loader to install the one or more software files into the at least one target device and thereby modify the software configuration of the at least one target device according to the update.

In some embodiments, the obtaining the software data comprises communicatively coupling to the computing device, via one of a wired and a wireless communication link, an electronic device having access to the software data, and executing a function at the computing device to execute the obtaining the software data at the computing device from the electronic device.

In some embodiments, the obtaining the software data comprises communicatively coupling to the computing device, via a wireless communication link, an electronic device located remotely from the aircraft and having access to the software data, and executing a function at the computing device to executed the obtaining the software data at the computing device from the electronic device.

In some embodiments, the executing the software loader comprises placing the at least one target device in a programming mode for the at least one target device to receive the one or more software files and store the one or more software files in a memory associated with the at least one target device.

In some embodiments, the method further comprises, at the computing device, in response to detecting a communication error with the at least one target device during the executing of the software loader, outputting a control signal comprising instructions to cause at least one corrective action to be performed on the at least one target device to recover from the communication error.

In some embodiments, the method further comprises, at the computing device, generating at least one notification indicative of a status of the installing of the one or more software files into the at least one target device, and outputting the at least one notification in real-time during the executing of the software loader.

In some embodiments, the at least one target device is a controller of at least one engine of the aircraft.

In some embodiments, the at least one target device is at least one Line Replaceable Unit (LRU) of the aircraft.

In some embodiments, the method further comprises receiving, at the computing device, one of a system-initiated command and a user-initiated command and obtaining the software data in response to the one of the system-initiated command and the user-initiated command.

In another aspect, there is provided a software update system for an aircraft. The system comprises at least one target device mounted to the aircraft, and a computing device mounted to the aircraft and communicatively coupled to the at least one target device, the computing device comprising a processing unit and a non-transitory computer-readable medium having stored thereon instructions executable by the processing unit for obtaining software data comprising a software loader and one or more software files containing an update to a software configuration of the at least one target device, and executing the software loader to install the one or more software files into the at least one target device and thereby modify the software configuration of the at least one target device according to the update.

In some embodiments, the instructions are executable by the processing unit for communicatively coupling to the computing device, via one of a wired and a wireless communication link, an electronic device having access to the software data, and obtaining the software data at the computing device from the electronic device.

In some embodiments, the instructions are executable by the processing unit for communicatively coupling to the computing device, via a wireless communication link, an electronic device located remotely from the aircraft and having access to the software data, and obtaining the software data at the computing device from the electronic device.

In some embodiments, the instructions are executable by the processing unit for executing the software loader comprising placing the at least one target device in a programming mode for the at least one target device to receive the one or more software files and store the one or more software files in a memory associated with the at least one target device.

In some embodiments, the instructions are executable by the processing unit for, in response to detecting a communication error with the at least one target device during the executing of the software loader, outputting a control signal comprising instructions to cause at least one corrective action to be performed on the at least one target device to recover from the communication error.

In some embodiments, the instructions are executable by the processing unit for generating at least one notification indicative of a status of the installing of the one or more software files into the at least one target device, and outputting the at least one notification in real-time during the executing of the software loader.

In some embodiments, the at least one target device is a controller of at least one engine of the aircraft.

In some embodiments, the at least one target device is at least one Line Replaceable Unit (LRU) of the aircraft.

In some embodiments, the instructions are executable by the processing unit for receiving, at the computing device, one of a system-initiated command and a user-initiated command, and obtaining the software data in response to the one of the system-initiated command and the user-initiated command.

In a further aspect, there is provided a non-transitory computer-readable medium having stored thereon program instructions executable by a processor for obtaining software data comprising a software loader and one or more software files containing an update to a software configuration of at least one target device mounted to an aircraft, and executing the software loader to install the one or more software files into the at least one target device and thereby modify the software configuration of the at least one target device according to the update.

DESCRIPTION OF THE DRAWINGS

Reference is now made to the accompanying figures in which.

It will be noticed that throughout the appended drawings, like features are identified by like reference numerals.

DETAILED DESCRIPTION

Figure 1A:
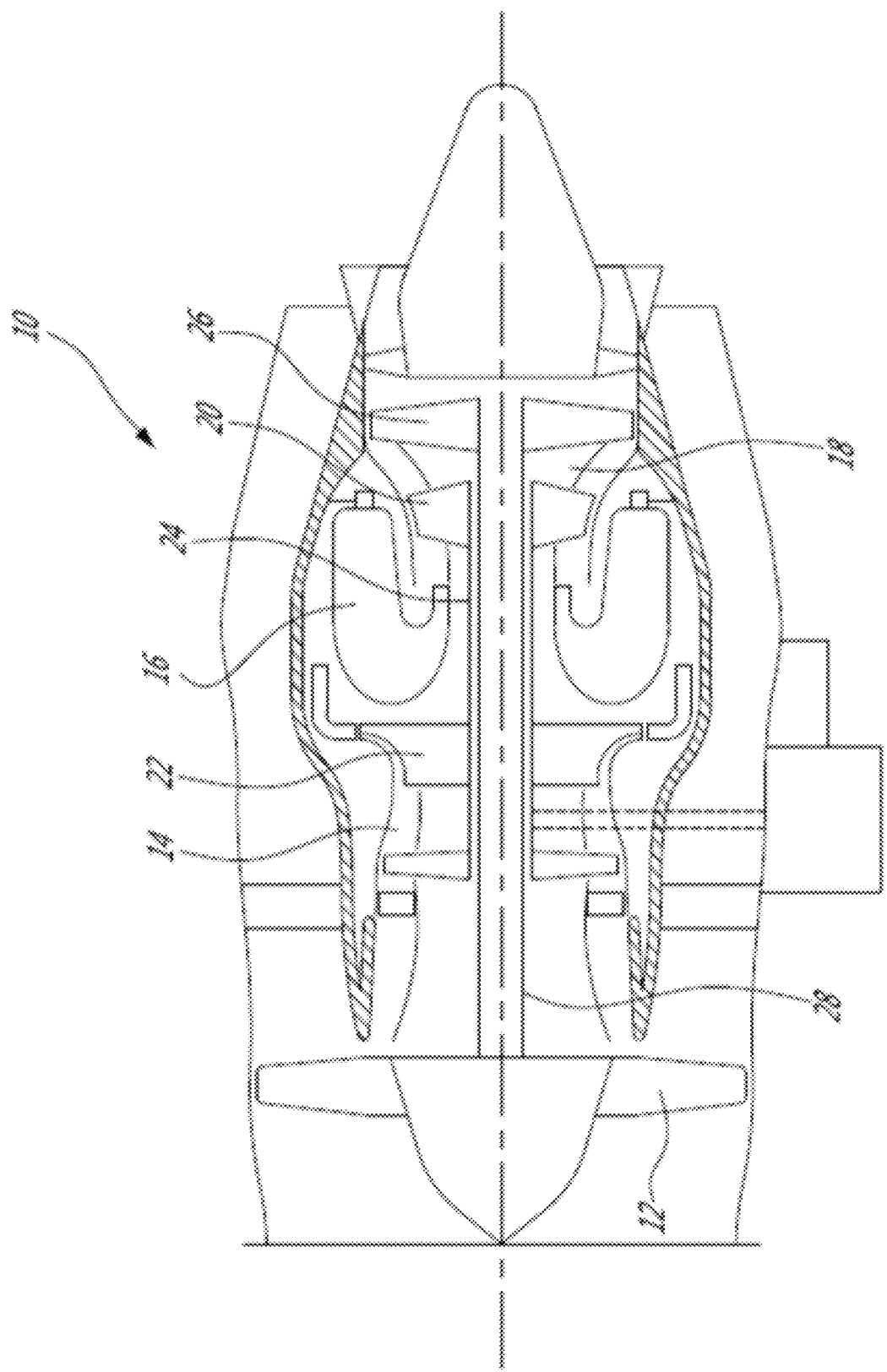
FIG. 1A is a schematic cross sectional view of a gas turbine engine, in accordance with an illustrative embodiment.

There is described herein systems and methods for software update in an aircraft. The aircraft is equipped with at least one engine. FIG. 1A illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

The systems and methods described herein may be applied to aircraft having single or multiple (i.e., two or more) engines. Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply. Other types of aircraft engines may also apply including, but not limited to, auxiliary power units (APUs), rotary engines, electric engines, and hybrid electric propulsion systems having a propeller driven in a hybrid architecture (series, parallel, or series/parallel) or turboelectric architecture (turboelectric or partial turboelectric).

Figure 1B:
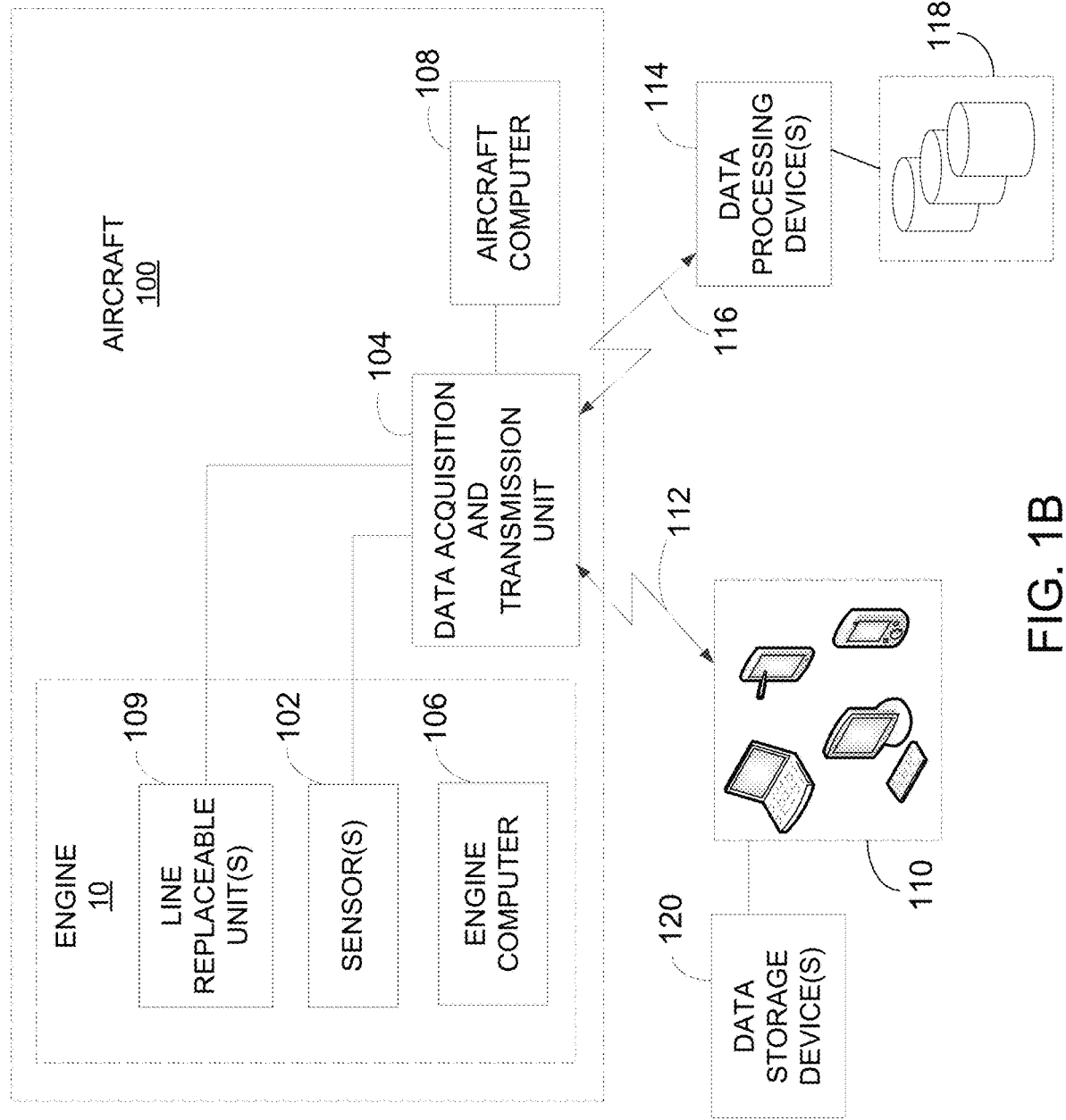
FIG. 1B is a schematic of an aircraft system, in accordance with an illustrative embodiment.

FIG. 1B illustrates an example aircraft 100, in accordance with one embodiment. At least one sensor 102 is provided per engine 10 of the aircraft 100. The sensor(s) 102 may comprise a variety of data collection devices mounted in the engine 10 or other areas of the aircraft 100. In some embodiments, the sensor(s) 102 are mounted directly on the engine 10 and the installation may be permanent or temporary. A permanent mount may be performed during manufacture of the engine 10. When the aircraft 100 is assembled, the sensor(s) 102 may be connected to an existing aircraft harness (not shown). One or more additional cables, adapters, connectors, and/or harnesses may be added in order to connect the sensor(s) 102 to the existing aircraft harness. A temporary mount may be performed after manufacture of the engine 10 and/or after aircraft assembly, such as during aircraft maintenance.

The sensor(s) 102 may be configured to collect one or more measurements (also referred to herein as "measurement data" or "sensor data") associated with operation of the engine 10 and/or the aircraft 100. The sensor(s) 102 are configured to acquire measurement(s) of parameter(s) of the engine 10 (referred to herein as "engine parameter(s)") and/or parameter(s) of the aircraft 100 (referred to herein as "aircraft parameter(s)") including, but not limited to, pressure (e.g., engine inlet total pressure, interstage pressure, engine pressure ratio or EPR), temperature (e.g., engine inlet total temperature, turbine inlet temperature, interstage temperature, engine exhaust gas temperature or EGT), altitude, speed (e.g., rotor speed of the engine's low-pressure rotor and high-pressure rotor, measured in Revolutions Per Minute (RPM)), acceleration, power, and torque. The sensor(s) 102 may also be configured to acquire measurement(s) of one or more parameters describing flight and ambient conditions (e.g., ambient pressure and temperature). It should however be understood that any other suitable measurements may be collected by the sensor(s) 102. Indeed, the parameters measured by the sensor(s) 102 may vary according to the type of the engine 10 and/or aircraft 100, and according to the application.

The sensor(s) 102 are illustratively configured to collect the one or more measurements during operation of the engine 10 and/or the aircraft 100 in-flight. The one or more measurement(s) may be collected continuously and in real-time, in order to provide a complete indication of the performance of the engine 10 and/or aircraft 100 during flight. The one or more measurement(s) may, alternatively or in addition, be collected at one or more points in time during the flight mission. In one embodiment, the measurement(s) may be acquired by the sensor(s) 102 during a stable cruise flight condition. As understood by those skilled in the art, a stable cruise condition corresponds to an operating condition of the aircraft 100 during which certain flight criteria, which may correspond to engine parameters and/or aircraft parameters, are attained. Stable cruise condition may be operator-specific. It should however be understood that the measurement(s) may be acquired by the sensor(s) 102 during any other suitable flight condition. For example, measurements (s) may be acquired during a constant climb phase of flight, which corresponds to a flight phase during which the aircraft 100 climbs to a given altitude at a constant climb rate.

The one or more measurements are then transmitted from the sensor(s) 102 to an aircraft-mounted electronic device (referred to herein as a "data acquisition and transmission unit") 104, continuously or at regular intervals, via the existing aircraft harness and/or additional cables, adapters, connectors, and/or harnesses. The Aeronautical Radio Inc. (ARINC) 429 data transfer standard for aircraft avionics may be used. Other data standards may also be used, including, but not limited to, ARINC 615, ARINC 629, ARINC 717, ARINC 664, Controller Area Network (CAN), UART RS-422, Ethernet and MIL-STD-1553. Alternatively, transmission of the data collected by the sensor(s) 102 is performed wirelessly. Therefore, the sensor(s) 102 may be configured for providing the measurement data to the data acquisition and transmission unit 104 via any suitable wired or wireless communication path (also referred to herein as a communication link).

As used herein, the term "wired" refers to the transfer of information (or data) between two points that are electrically connected (e.g., by an electrical conductor). When reference is made herein to a wired connection, link or path, it should be understood that any suitable technology may be used to establish the wired connection including, but not limited to, RS-232, USB, USB 2.0, USB 3.0, USB-C, Thunderbolt™, Ethernet, and the like. As used herein, the term "wireless" refers to the transfer of information (or data) between two points that are not connected by an electrical conductor. When reference is made herein to a wireless connection, link or path, it should be understood that any suitable wireless technology may be used to establish the wireless connection including, but not limited to, radio waves (e.g., VHF radio, HF radio), Bluetooth™, Zigbee™, Ultra-wideband (UWB), mobile broadband, wireless spread spectrum such as Wi-Fi (Standardized as IEEE 802.11 a, b, g, n, ac, ax), cellular data service, satellite communication (SATCOM), SATA, e-SATA, and the like.

In one embodiment, the data acquisition and transmission unit 104 may also receive data from an aircraft computer 106 and/or an engine computer 108. This data will be collectively referred to as aircraft data, and denotes engine and/or aircraft performance parameters. The aircraft computer 108 may be an aircraft management controller (AMC), a flight management system (FMS), an aircraft digital computer system, or any other device used for computing inside an aircraft 100. The engine computer 106 may be any type of computing unit of an engine 10, such as an engine control unit (ECU), an engine electronic controller (EEC), an engine electronic control system, and a Full Authority Digital Engine Controller (FADEC). Data transmitted from the aircraft computer 108 and/or engine computer 106 to the data acquisition and transmission unit 104 (or vice versa) may be provided over a dedicated communication bus (e.g., a CAN bus) or any other existing communication system of the aircraft 100.

Example data provided by the aircraft computer 108 comprises airspeed, altitude, stability, and position of the aircraft 100 at any point in time during a flight. Example data provided by the engine computer 106 comprises engine torque, engine speed, engine rating, engine torque stability, and engine compressor speed stability at any point in time during engine operation. The engine computer 106 may further be configured to detect fault(s) of the engine 10 (i.e. a physical fault that affects the thermodynamic performance of the engine 10 or a system fault) and accordingly generate engine fault data, which may also be sent to the data acquisition and transmission unit 104. It should however be understood that engine fault detection may alternatively be performed in the data acquisition and transmission unit 104, based on the data received from the sensor(s) 102, engine computer 106, and/or aircraft computer 108. In some embodiments, the sensor(s) 102 may be connected to or read by the engine computer 106 and/or the aircraft computer 108 such that the measurement(s) collected by the sensor(s) 102 are received by the data acquisition and transmission unit 104 from the engine computer 106 and/or the aircraft computer 108 (instead of directly from the sensor(s) 102).

The data received at the data acquisition and transmission unit 104 from the sensor(s) 102, engine computer 106, and/or aircraft computer 108 data is collectively referred to herein as "aviation data". In other words, the term "aviation data" refers to the sensor data received from the sensor(s) 102 and/or the aircraft data received from the aircraft computer 108 and/or the engine computer 106. The aviation data may be collected from one or more locations of the aircraft 100 and received at the data acquisition and transmission unit 104 in real-time or at regular intervals during a flight mission of the aircraft 100, based on specific operational conditions of the engine 10 and/or the aircraft 100. In other embodiments, the data acquisition and transmission unit 104 receives data from the sensor(s) 102, engine computer 106, and/or aircraft computer 108 at the end of the aircraft's flight mission. As used herein, the term "mission" refers to a flight to perform a specific task. The mission may be defined by various parameters, such as duration, destination, cargo, and any flying parameters to be used during the mission, such as speed or maximum altitude. For example, operator X may have aircraft A and B fly at a speed of 1050 RPM while aircraft C flies at a speed of 975 RPM. The value associated for the flight criteria "speed" may therefore differ between aircraft A and B and aircraft C. In some embodiments, operator X may define a unique set of flight criteria and associated values for each flight of an aircraft as a function of the specific flight parameters of a given flight, such as speeds, cruising altitudes, etc.

The engine 10 illustrated in FIG. 1B further comprises one or more line replaceable units (LRUs) 109 communicatively coupled to the data acquisition and transmission unit 104. It should however be understood that, although not illustrated, at least some LRUs 109 may be mounted on the aircraft 100. An LRU as in 109 is a modular component of the aircraft 100 or engine 10 that is designed to be removed and replaced at an operating location (also referred to as a "line") in the event of failure. In particular, LRUs may be stocked and are replaced quickly from nearby on-site inventories (i.e. at the field level), while failed or unserviceable LRUs undergo repair and overhaul actions in other locations (or lines). As such, the LRUs 109 may be removed and replaced as an aircraft line maintenance task, where maintenance can be performed on-wing. This may, for instance, alleviate the need to remove the entire engine 10 in order to get access to the part (i.e. the LRU 109 to be replaced) in a shop environment, upon disassembly. In one embodiment, the LRUs 109 comprise, but are not limited to, sensors as in 102 (e.g., blade angle feedback sensors, temperature sensors such as engine inlet temperature (T1) sensors), transducers (e.g., pressure transducers such as compressor exit pressure (P3) transducers, torque pressure transducers, fuel differential pressure transducers, main oil pressure transducers), valves and detectors (e.g., flow divider and dump valve, oil-to-fuel heater, ignition exciter), control units (e.g., propeller control unit, fuel control unit), and wiring harnesses (e.g., main electrical main harness, EEC wiring harness).

As can be seen in FIG. 1B, the data acquisition and transmission unit 104 is a communication system configured for receiving data (e.g., aviation data) from the sensor(s) 102, the LRU(s) 109, the engine computer 106, the aircraft computer 108, and/or other aircraft and engine systems, and transmitting the received data (raw or processed) to one or more systems on-board the aircraft 100 or off the aircraft 100. The data acquisition and transmission unit 104 may take various forms, such as a Data Acquisition and Transmission Unit (DCTU), a Flight Data Acquisition Storage and Transmission (FAST™) system, as manufactured by Pratt &

Whitney Canada, or any other computer-controlled unit. It should be understood that, while FIG. 1B illustrates (for clarity purposes) a single data acquisition and transmission unit 104, more than one unit as in 104 may be provided.

The data acquisition and transmission unit 104 may comprise one or more antenna, one or more processors, and a memory (none shown). The processor(s) may be coupled to one or more data buses of the aircraft 100 for receiving the aviation data from the sensor(s) 102, LRU(s) 109, engine computer 106, and/or aircraft computer 108. As previously noted, the aviation data may be transmitted to and received at the data acquisition and transmission unit 104 using any suitable wired or wireless communication path. In some embodiments, the processor(s) of the data acquisition and transmission unit 104 may be configured to process the received aviation data. The data acquisition and transmission unit 104 may perform a conversion of the aviation data to a digitized form if received in analog form. It should however be understood that digitization of the aviation data may alternatively be performed by a dedicated device provided on the aircraft 100 separately from the data acquisition and transmission unit 104. In some embodiments, the data acquisition and transmission unit 104 may be configured to store the received aviation data in memory.

The data acquisition and transmission unit 104 is also configured for receiving data (e.g., software data pertaining to a software update) from one or more client devices 110 via a communication link 112 and/or from one or more processing devices 114 via a communication link 116, the communication links 112 and 116 being any suitable wired or wireless communication link. The one or more client device 110 and/or the one or more processing device 114 have access to the software data, as described further below. In one embodiment, the communication link 112 is wired (e.g. a USB connection) and the communication link 116 is wireless. In another embodiment, both the communication link 112 and the communication link 116 are wireless. Other embodiments may apply. The data acquisition and transmission unit 104 may be configured to communicate with more than one client device 110 (or more than one data processing device 114), although not necessarily with more than one type of client device 110 (or more than one type of data processing device 114) at one time.

As used herein, the term "software data" refers to a software package received at the data acquisition and transmission unit 104 (or any other suitable aircraft-mounted computing device communicatively coupled to the engine computer 106 and/or LRU(s) 109, and to the one or more client devices 110 and/or one or more processing devices 114) for use in updating a software configuration of one or more target devices (e.g., engine computer 106 and/or LRU(s) 109) of the aircraft 100. As used herein, the term "target device" refers to components or systems installed on the aircraft 100 (e.g., provided on the engine 10) and that rely on software to perform their function. The data acquisition and transmission unit 104 behaves as a hosting platform on which the software package is ran to update the software configuration of the target device(s). In some embodiments, the data acquisition and transmission unit 104 may be configured to store the entirety of the software data in a memory (or other data storage means) associated with the data acquisition and transmission unit 104. In other embodiments, the data acquisition and transmission unit 104 may be configured to perform software updates without storing the entirety of the software data in memory. In this case, the data acquisition and transmission unit 104 may access the software data sin partial blocks on demand over a network connection (e.g., communication link 112 or 116 or a connection to a cloud storage medium, not shown). Still, it is desirable for at least part of the software data to be stored in the memory associated with the data acquisition and transmission unit 104 prior to the software data being provided to the target device(s).

The software package includes one or more software files containing one or more updates to the software configuration of the target device(s) and a software loader configured to be executed by the data acquisition and transmission unit 104 to load the one or more software files into the target device(s). The software package may further contain one or more identifiers (e.g., one or more part numbers) indicating the target device(s) into which the software files are to be loaded. The data acquisition and transmission unit 104 may therefore modify the software configuration of more than one target device, simultaneously or in sequence.

As used herein, the term "load", "loading", "install" or "installing" refers to the process of transferring and programming software into a target device (without removal of the target device from the aircraft 100), thus changing the configuration of the software controlling the operation and functionality of the target device. The term "configuration" refers to a particular combination of versions of a given software, with each version referring to a specific item of the software at a given revision status. The software configuration of the target device may not have the latest version of the software installed, thus requiring a modification in order to improve the operation or functionality of the target device or ensure that the target device's software configuration remains compliant with applicable aircraft regulations. The software modification (also referred to herein as an "update") may comprise an enhancement to the current software version or provision of a new version of the software.

The client device(s) 110 comprise any portable or handheld electronic communication device, such as a smartphone, a desktop computer, a portable (or laptop) computer, a tablet, a hand-held electronic device, an electronic flight bag, or the like, adapted to communicate over the communication link 112. In one embodiment, the client device(s) 110 are external to the aircraft 100 and are provided for maintenance (e.g., troubleshooting) purposes. In other embodiments, the client device(s) 110 may be provided on the aircraft 100. Maintenance personnel may use their client device 110 to access the data acquisition and transmission unit 104 via the communication link 112 and retrieve the aviation data therefrom for the purpose of performing maintenance on the engine 10 to troubleshoot malfunctions. Fault codes and associated indication messages contained in the aviation data collected by the data acquisition and transmission unit 104 may be accessed and used to direct maintenance efforts, which may be performed while the aircraft 100 is on the ground. In addition, maintenance personnel may use their client device 100 to distribute (e.g., during maintenance activities) software updates to the data acquisition and transmission unit 104 for loading in at least one target device provided on the aircraft 100. In one embodiment, the target device whose software configuration is to be modified is the engine computer 106. In another embodiment, the LRU(s) 109 are the target device(s) whose software configuration is to be modified.

In one embodiment, the software data may be distributed to the data acquisition and transmission unit 104 from a client device 110 via a data storage device 120 (also referred to as "software media") physically coupled to the client device 110. The data storage device 120 may be removable (i.e. removably coupled to the client device 110) and includes, but is not limited to, a flash memory device (e.g., a Secure Digital (SD)/microSD card, a USB key or drive), a compact disc (CD), a memory card, or the like). A single data storage device may store several software packages (e.g., several software loaders and several software files) for use on multiple target devices of the aircraft 100. For example, a software package (pertaining to a software update for the engine computer 106) may be provided to an operator on a USB key. The operator may then connect their client device 110 (e.g., their laptop) to the data acquisition and transmission unit 104 (via communication link 112, which may be wired or wireless) and insert the USB key in a corresponding USB port of the client device 110. The software package is then transferred to the data acquisition and transmission unit 104, which in turn executes the software loader to load the software files into the engine computer 106 and to modify the configuration of the software controlling operation and functionality of the engine computer 106. In other embodiments, distribution of the software package may involve no data storage device as in 120. Instead, the software package may be stored in a memory (e.g., a non-volatile memory) of the client device 110 for subsequent retrieval by the data acquisition and transmission unit 104 when the software update is to be performed. In this embodiment, the communication link 112 between the client device 110 and the data acquisition and transmission unit 104 may be wireless.

Still referring to FIG. 1B, in some embodiments, the software data may be distributed to the data acquisition and transmission unit 104 from one or more electronic device(s) (also referred to herein as data processing device(s)) 114 that comprise one or more servers or other computing device(s) located remotely from the aircraft 100 (i.e. off-aircraft). The data processing device(s) 114 may comprise a series of servers corresponding, but not limited, to a microserver, a web server, an application server, and a database server. In one embodiment, the data processing device(s) 114 is a server provided on the ground (referred to herein as a "ground server"). It should however be understood that the methods and systems described herein may use cloud computing, such that the data processing device(s) 114 may be a cloud server. Indeed, the systems and methods described herein may support Internet of Things (I) connectivity with a cloud data analytics platform. Distributed computing may also apply, such that the data processing device(s) 114 may comprise a set of two or more servers. Any other suitable data processing device may apply. These servers are all represented by data processing device(s) 114 in FIG. 1B. In addition, it should be understood that, while the one or more data processing device(s) 114 are illustrated as being remote from the aircraft 100, the data processing device(s) 114 may, in some embodiments, be provided on-board the aircraft 100 (e.g., as part of the data acquisition and transmission unit 104).

Each data processing device 114 is configured to access the data acquisition and transmission unit 104 via the communication link 116 and retrieve the aviation data. The data processing device 114 may be configured to store the aviation data in a data warehouse 118 communicatively coupled to the data processing device 114. The data processing device 114 may then subsequently uses the data from the data warehouse 118 for further processing. In some embodiments, the data processing device 114 also has access to or stores (e.g., in the data warehouse 118) one or more software packages accessible to the data acquisition and transmission unit 104 via the communication link 116. In response to a user-initiated or system-initiated command, the data acquisition and transmission unit 104 may retrieve the software package from the data processing device 114 for subsequent loading to the target device(s) (e.g., the engine computer 106 and/or the LRU(s) 109).

The data warehouse 118 described herein may be provided as collections of data or information organized for rapid search and retrieval by a computer. It is structured to facilitate storage, retrieval, modification, and deletion of data in conjunction with various data-processing operations. The data warehouse 118 may consist of a file or sets of files that can be broken down into records, each of which consists of one or more fields. Database information may be retrieved through queries using keywords and sorting commands, in order to rapidly search, rearrange, group, and select the field. The data warehouse 118 may be any organization of data on a data storage medium, such as one or more servers. It should be understood that the data warehouse 118 may also be provided in a cloud-based server-less environment.

After having obtained the software data (from the one or more client devices 110 and/or from the one or more processing devices 114), the data acquisition and transmission unit 104 loads the software data into the engine computer 106, the LRUs 109, or any other suitable target device provided on-board (e.g., mounted to) the aircraft and to which the data acquisition and transmission unit 104 is communicatively coupled (e.g., in a bidirectional manner). Although reference is made herein to the data acquisition and transmission unit 104 being used to load the software data into the target device(s), it should be understood that any other aircraft-mounted computing device having communication capabilities and connectivity (wired or wireless) to the target device(s) and to the one or more client devices 110 and/or the one or more processing devices 114 may apply. For example, a maintenance system provided on-board (e.g., mounted to) the aircraft 100 and communicatively coupled to the target device(s) and to the one or more client devices 110 and/or the one or more processing devices 114 may be used to load software updates (e.g. during maintenance of the aircraft 100) to the target device(s) for modifying a software configuration thereof. In some embodiments, the software data may be loaded into the target device(s) using a computing device (e.g., a handheld electronic device) that is not mounted to the aircraft 100.

In one embodiment, the data acquisition and transmission unit 104 executes the software loader to load the one or more software files into the target device(s), causing the target device(s) to be programmed according to the one or more software files to modify the software configuration of the target device(s). In some embodiments, the target device(s) are programmed upon the data acquisition and transmission unit 104 reading the contents (i.e. program instructions) of the software files into the memory of the target device(s). It should however be understood that, in other embodiments, the data acquisition and transmission unit 104 installs the software files into the target device(s) without the software files being stored in the memory of the target device(s). In one embodiment, execution of the software loader by the data acquisition and transmission unit 104 triggers a reboot of the target device (e.g., the engine computer 106) where the target device is placed in a programming mode. When in the programming mode, the target device is able to receive the software files from the data acquisition and transmission unit 104 and, in some embodiments, to store the software files in memory. The target device may also be configured to validate the software files upon receipt, prior to storage thereof in memory. The validation process may imply verifying, using operator-defined rules, that the software files meet operator specifications and have not been altered during transfer from one location to another (e.g., from the data acquisition and transmission unit 104 to the target device). The data acquisition and transmission unit 104 may be configured to monitor the status of the software loading process and to cause the target device to exit the programming mode, e.g. after the software files are stored in the memory associated with the target device.

In some embodiments, execution of the software loader by the data acquisition and transmission unit 104 triggers an error detection process that is performed to detect and manage any possible communication error that may occur during the software update. By monitoring the software loading process in real-time upon execution of the software loader, the data acquisition and transmission unit 104 may be configured to detect any such error (e.g., resulting in failure to load the software files into the target device) and to initiate, upon detection of the error, a retry procedure. In one embodiment, the error may be a handshake error, a communication interruption, a connectivity interruption, or a cable disconnect between the data acquisition and transmission unit 104 to the target device (e.g., the engine computer 106). In some embodiments, the data acquisition and transmission unit 104 may output a control signal comprising instructions to cause at least one corrective action to be performed on the target device to recover from the communication error. Initiation of the retry procedure may thus entail outputting instructions to the user (e.g., via the client device 110) to prompt the user to verify the connection (e.g., the EEC wiring harness) between the data acquisition and transmission unit 104 to the target device and power cycle the target device. The user may be prompted to repeat the retry procedure (i.e. perform the action on the target device) a predetermined number of times (e.g., five times) until the error is solved. In other embodiments, the data acquisition and transmission unit 104 may cause a block of software data to be resent, for instance in the event of a checksum error. The data acquisition and transmission unit 104 may alternatively or in addition output the control signal to the target device to cause the target device to automatically take action to recover from the communication error. For example, the control signal may cause the target device to reboot automatically. If the error persists after the predetermined number of times, the data acquisition and transmission unit 104 declares the software loading process a failure and aborts the process.

The transfer of the software package to the data acquisition and transmission unit 104, the execution of the software loader, and the installing of the software files into the target device may occur automatically without any human intervention (e.g., upon connection of a client device 110 and/or of a data processing device 114 to the data acquisition and transmission unit 104, when wireless communication is available at a destination point of the aircraft 100). In some embodiments, the transfer of the software package to the data acquisition and transmission unit 104, the execution of the software loader, and the installing of the software files into the target device may occur in response to a system-initiated command generated by any suitable system or component of the aircraft 100. For example, the system-initiated command may be generated by the engine computer 106, the aircraft computer 108, the LRU(s) 109, or by the data acquisition and transmission unit 104, in response to any one of the engine computer 106, the LRU(s) 109, or the data acquisition and transmission unit 104 being powered on. Alternatively, the transfer of the software package to the data acquisition and transmission unit 104, the execution of the software loader, and the loading of the software files into the target device may occur in response to a command which is user-initiated. The user-initiated command may be placed by an operator using a suitable input means (e.g., a keyboard, touchscreen, or the like) associated with the client device 110. The user-initiated command may alternatively be generated as a result of a user (e.g., a pilot) actuating a button, switch, knob, or other input or control means provided in the cockpit (or other suitable location) of the aircraft 100.

In some embodiments, the data acquisition and transmission unit 104 may be configured to generate in real-time, during execution of the software loader and loading of the software files, notifications (e.g., visual and/or audio) indicative of the completion status of the software update being performed on the target device. The notifications may then be output to the client device(s) 110 using any suitable output means (e.g., a screen, a speaker, or the like) associated with the client device(s) 110 or any suitable communication means (e.g., text message, email, or the like). For instance, a graphical user interface may be generated and presented to an operator (e.g., via a screen of the client device 110, or via a cockpit display provided on the aircraft 100 and controlled by the aircraft computer 108) throughout the software update process to provide the notifications on completion status and present final results. The operator may alternatively use their client device 110 to access, using a suitable web browser, a secured web portal or a webpage (e.g. an engine maintenance webpage) to monitor the progress of the software update.

Figure 2:
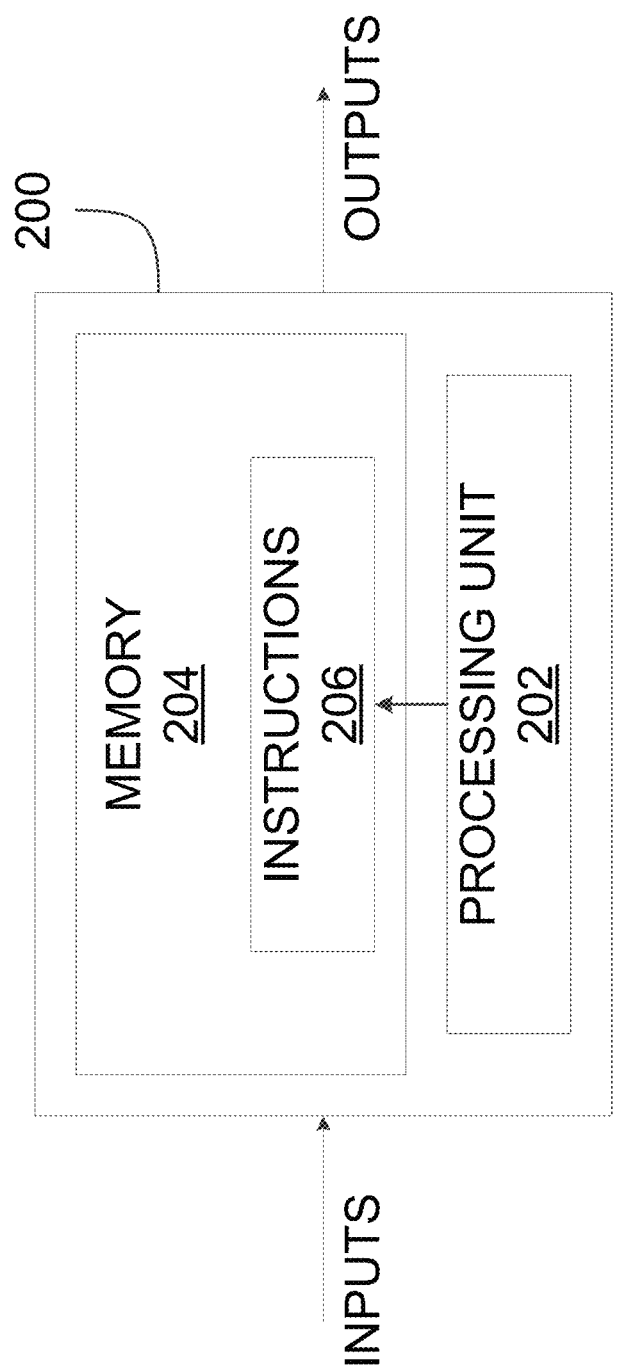
FIG. 2 is a block diagram of an example computing device, in accordance with an illustrative embodiment.

With reference to FIG. 2, an example of a computing device 200 is illustrated. For simplicity only one computing device 200 is shown but more computing devices 200 operable to exchange data may apply. The computing devices 200 may be the same or different types of devices. Each of the data acquisition and transmission unit (reference 104 in FIG. 1B), the engine computer (reference 106 in FIG. 1B), the aircraft computer (reference 108 in FIG. 1B), the client device(s) 110, and the data processing device(s) 114 may be implemented with one or more computing devices 200. The computing device 200 may also be used to implement the method described herein (e.g., the method 400 of FIG. 4A and FIG. 4B).

The computing device 200 comprises a processing unit 202 and a memory 204 which has stored therein computer-executable instructions 206. The processing unit 202 may comprise any suitable devices configured to implement the method 400 such that instructions 206, when executed by the computing device 200 or other programmable apparatus, may cause the functions/acts/steps performed as part of the method 400 as described herein to be executed. The processing unit 202 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 204 may comprise any suitable known or other machine-readable storage medium. The memory 204 may comprise non-transitory computer readable storage medium, for example, but not limited to, an electronic, magnetic, optical, electromagnetic, infrared, or semiconductor system, apparatus, or device, or any suitable combination of the foregoing. The memory 204 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 204 may comprise any storage means (e.g., devices) suitable for retrievably storing machine-readable instructions 206 executable by processing unit 202.

The instructions 206 may be implemented in a high level procedural or object oriented programming or scripting language, or a combination thereof, to communicate with or assist in the operation of a computer system, for example the data acquisition and transmission unit 104. Alternatively, the instructions 206 may be implemented in assembly or machine language. The language may be a compiled or interpreted language. The instructions 206 may be readable by a general or special-purpose programmable computer.

The methods and systems described herein may be implemented in a high level procedural or object oriented programming or scripting language, or a combination thereof, to communicate with or assist in the operation of a computer system, for example the computing device 200. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 202 of the computing device 200, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Figure 3:
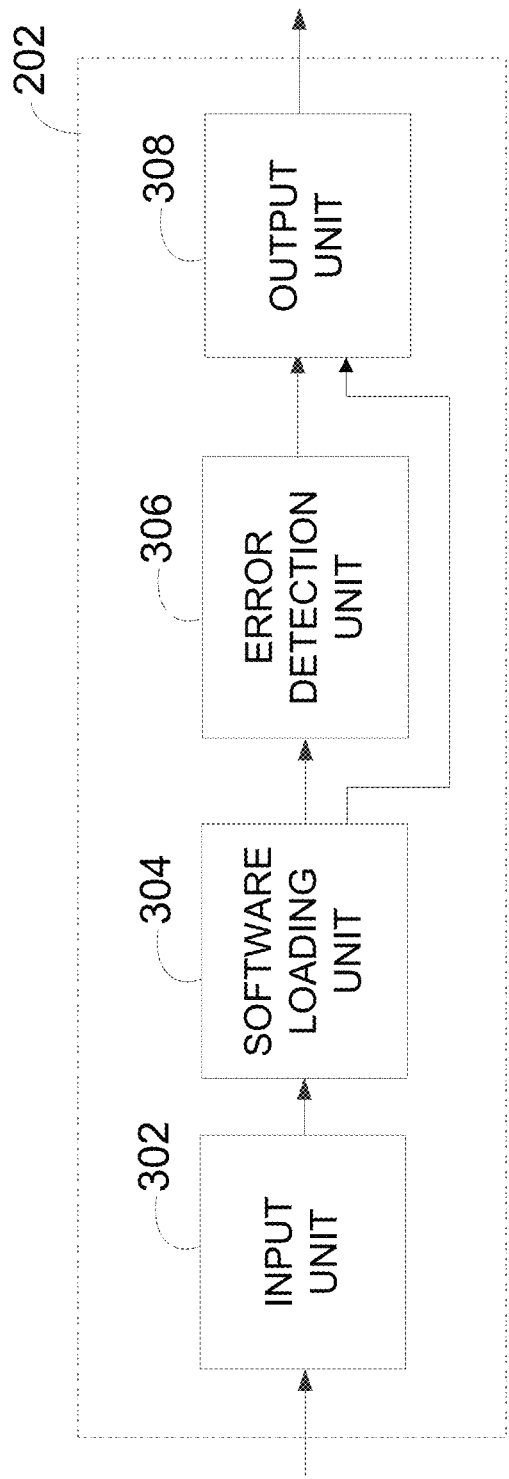
FIG. 3 is a block diagram of the processing unit of FIG. 2, in accordance with an illustrative embodiment.

Referring now to FIG. 3 in addition to FIG. 1B, the processing unit 202 illustratively comprises an input unit 302, a software loading unit 304, an error detection unit 306, and an output unit 308. The processing unit 202 may be provided as part of the data acquisition and transmission unit 104. Although the input unit 302, software loading unit 304, error detection unit 306, and output unit 308 are illustrated as being separate from one another, it should be understood that units 302, 304, 306, and 308 may be integrated together into one or more units.

The input unit 302 illustratively comprises a data interface (not shown) configured to receive, directly or indirectly, data from the sensor(s) 102, the engine computer 106, the LRU (s) 109, the aircraft computer 108 (e.g., via one or more data buses, connectors, and the like, as described herein above), the client device(s) 110 (e.g., via communication link 112), and/or the data processing device(s) 114 (e.g., via communication link 114). The received data may comprise aviation data and software data, as described herein above. In some embodiments, the input unit 302 may be configured to digitize the data if received in analog form.

The software data is sent to the software loading unit 304 for loading into one or more target devices (e.g., the engine computer 106 and/or the LRU(s) 109). The software loading unit 304 is configured to implement the functionality of the software loader described herein with reference to FIG. 1B, in response to a user-initiated or system-initiated command. In particular, the software loading unit 304 is configured to trigger a reboot of the target device(s) which places the target device(s) in a programming mode that enables the target device(s) to receive the software files and, in some embodiments, to store the software files in memory. The target device(s) are then programmed according to the one or more software files (to modify the software configuration of the target device(s)), for instance upon the software loading unit 304 reading the contents of the software files into the memory of the target device(s). The software loading unit 304 is also configured to cause the target device(s) to exit the programming mode after the software files have been loading into one or more target devices.

In some embodiments, the error detection unit 306 is configured to be ran simultaneously with the software loading unit 304 and may be combined therewith as a single unit. The error detection unit 306 is configured to detect and manage communication or handshake errors that may occur during the software update performed by the software loading unit 304. As described herein with reference to FIG. 1B, upon detection of an error, the error detection unit 306 may be configured to trigger a retry procedure that prompts the user to resolve the detected error (e.g., by verifying wiring connections or power cycling the target device). During the software loading process and/or the error detection process, the software loading unit 304 and/or the error detection unit 306 may generate one or more notifications that are then sent to the output unit 308. The output unit 308 in turn causes the notifications to be output (e.g., to the client device(s) 110 or to a cockpit display, as described herein above).

Figure 4:
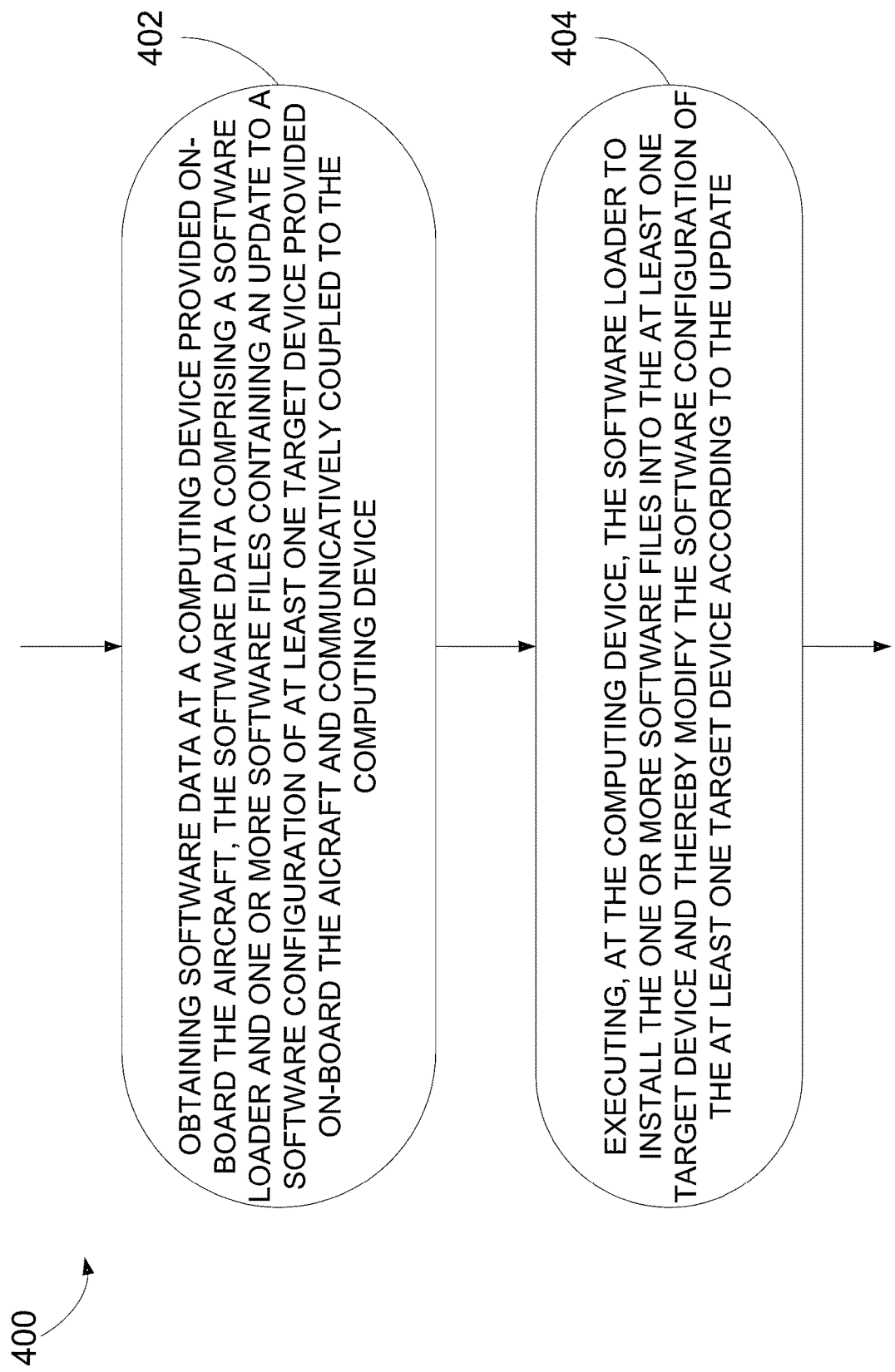
FIG. 4 is a flowchart illustrating a method for software update in an aircraft, in accordance with an illustrative embodiment.

Referring now to FIG. 4, a method 400 for software update in an aircraft, such as the aircraft 100 of FIG. 1B, will now be described in accordance with one embodiment. The method 400 may be performed at the data acquisition and transmission unit (reference 104 of FIG. 1B) or any other suitable computing device provided on-board the aircraft and communicatively coupled to at least one target device provided on-board the aircraft (e.g., the engine computer 106 and/or the LRUs 109), and to the client device(s) 110 and/or the data processing device(s) 114. The method 400 comprises the step 402 of obtaining software data comprising a software loader and one or more software files containing an update to a software configuration of the at least one target device. The software data may be obtained at step 402 from the client device(s) 110 and/or from the data processing device(s) 114, via any suitable wired or wireless communication path, as described herein above with reference to FIG. 1B. In one embodiment, the step 402 of obtaining the software data comprises communicatively coupling the client device(s) 110 and/or the data processing device(s) 114 (having access to the software data) via a wired and/or a wireless communication link and executing a function at the computing device for obtaining the software data from the client device(s) 110 and/or the data processing device(s) 114. The method 400 also comprises the step 404 of executing, at the computing device (e.g., at the data acquisition and transmission unit 104), the software loader to install the one or more software files into the at least one target device and thereby modify the software configuration of the at least one target device according to the update. Step 404 may include performing an error detection procedure as described herein with reference to FIG. 1B. Notifications may be output (e.g., to the client device(s) 110) as step 404 is being performed, to provide an indication of a status of the software update process.

In some embodiments, the systems and methods described herein may allow to update aircraft-mounted target devices (e.g., engine controllers) by using connectivity of the target devices to an aircraft-mounted computing device (e.g., the data acquisition and transmission unit which is part of the engine build of material). This may alleviate the need for special equipment (e.g., cables, power supply, custom portable electronic device, and the like) to perform software updates in the aircraft since target devices may be reprogrammed directly from the aircraft-mounted computing device. In addition, the operator's tasks during the software update process may be limited to performing power cycles of the target device via the aircraft cockpit and to verify (e.g., via the cockpit display) that the software update is reported as successful (e.g., the proper software version is installed). These tasks may be performed upon the operator being prompted to do so by the systems and methods described herein. As such, in some embodiments, the software update process may require no special training and may prove more reliable. A fleet reprogramming campaign may thus be implemented to update multiple target devices (e.g., EECs) in service on an operator's aircrafts with reduced logistic effort and costs.

In addition, in the event of an unsuccessful software loading process caused by a communication error, the systems and methods described herein may alleviate the need for removal and replacement of a target device with a new target device having a new software version already loaded.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of updating software on an electronic engine controller (EEC) of an engine of an aircraft, the method comprising:
   communicatively coupling a client electronic device to a data acquisition and transmission unit mounted to the aircraft, the data acquisition and transmission unit being communicatively coupled to the EEC and configured to receive aviation data indicative of a performance of the engine during operation of the engine and communicate the aviation data remotely of the aircraft;
   receiving a user-initiated command from an operator at an input of the client electronic device;
   in response to receiving the user-initiated command at the input of the client electronic device, obtaining software data at the data acquisition and transmission unit mounted to the aircraft, the software data comprising a software loader configured to be executed by the data acquisition and transmission unit and one or more software files containing an update to a software configuration of the EEC;
   executing, at the data acquisition and transmission unit, the software loader to install the one or more software files into the EEC and thereby modify the software configuration of the EEC according to the update, the executing of the software loader comprising placing the EEC in a programming mode for the EEC to receive the one or more software files, validate the one or more software files upon receipt prior to storage into a memory associated with the EEC, and store the one or more software files in the memory associated with the EEC;
   monitoring, at the data acquisition and transmission unit, a software loading process in real-time during the executing of the software loader installing the one or more software files into the EEC; and
   exiting the programming mode after the installing of the one or more software files into the EEC.

2. The method of claim 1, wherein:
   the client electronic device is communicatively coupled to the data acquisition and transmission unit via a wired communication link;
   the client electronic device has access to the software data; and obtaining the software data at the data acquisition and transmission unit includes receiving the software data from the client electronic device.

3. The method of claim 1, wherein the obtaining the software data comprises communicatively coupling to the data acquisition and transmission unit, via a wireless communication link, a remote electronic device located remotely from the aircraft and having access to the software data, and executing a function at the data acquisition and transmission unit to execute the obtaining the software data at the data acquisition and transmission unit from the remote electronic device.

4. The method of claim 1, further comprising, at the data acquisition and transmission unit, in response to detecting a communication error with the EEC during the executing of the software loader, outputting a control signal comprising instructions to cause at least one corrective action to be performed on the EEC to recover from the communication error.

5. The method of claim 1, further comprising, at the data acquisition and transmission unit, generating at least one notification indicative of a status of the installing of the one or more software files into the EEC, and outputting the at least one notification in real-time during the executing of the software loader.

6. The method of claim 1, wherein the monitoring of the software loading process is accessible on a secured web portal.

7. The method of claim 1, wherein the client electronic device is portable and is communicatively coupled to the data acquisition and transmission unit via a wired communication link.

8. The method of claim 7, comprising providing an indication of a progress of the software update to the operator via the client electronic device.

9. A system for updating software on an electronic engine controller (EEC) of an engine of an aircraft, the system comprising:
a portable client electronic device; and
a data acquisition and transmission unit mounted to the aircraft and communicatively coupled to the EEC and to the portable client electronic device, the data acquisition and transmission unit comprising a processing unit and a non-transitory computer-readable medium having stored thereon instructions executable by the processing unit for:
receiving aviation data via one or more sensors, the aviation data being indicative of a performance of the engine during operation of the engine;
communicate the aviation data remotely of the aircraft;
in response to receiving a user-initiated command from an operator at the client electronic device, obtaining software data comprising a software loader configured to be executed by the data acquisition and transmission unit and one or more software files containing an update to a software configuration of the EEC;
executing the software loader to install the one or more software files into the EEC and thereby modify the software configuration of the EEC according to the update, the executing of the software loader comprising placing the EEC in a programming mode for the EEC to receive the one or more software files, validate the one or more software files upon receipt prior to storage into a memory associated with the EEC, and store the one or more software files in the memory associated with the EEC;
monitoring a software loading process in real-time during the executing of the software loader installing the one or more software files into the EEC; and
exiting the programming mode after the installing of the one or more software files into the EEC.

10. The system of claim 9, wherein the client electronic device is communicatively coupled to the data acquisition and transmission unit via a wired communication link.

11. The system of claim 9, wherein the instructions are executable by the processing unit for communicatively coupling to the data acquisition and transmission unit, via a wireless communication link, a remote electronic device located remotely from the aircraft and having access to the software data, and obtaining the software data at the data acquisition and transmission unit from the remote electronic device.

12. The system of claim 9, wherein the instructions are executable by the processing unit for, in response to detecting a communication error with the EEC during the executing of the software loader, outputting a control signal comprising instructions to cause at least one corrective action to be performed on the EEC to recover from the communication error.

13. The system of claim 9, wherein the instructions are executable by the processing unit for generating at least one notification indicative of a status of the installing of the one or more software files into the EEC, and outputting the at least one notification in real-time during the executing of the software loader.

14. The system of claim 9, wherein the monitoring of the software loading process is accessible on a secured web portal.

* * * * *